(12) United States Patent
Koizumi

(10) Patent No.: US 7,513,435 B2
(45) Date of Patent: Apr. 7, 2009

(54) SERVICE PROVIDING SYSTEM

(75) Inventor: Kouji Koizumi, Tokyo (JP)

(73) Assignee: Techfirm Inc., Tokyo (JP)

( * ) Notice: Subject to any disclaimer, the term of this patent is extended or adjusted under 35 U.S.C. 154(b) by 469 days.

(21) Appl. No.: 11/352,706

(22) Filed: Feb. 10, 2006

(65) Prior Publication Data

US 2006/0213991 A1    Sep. 28, 2006

(30) Foreign Application Priority Data

Feb. 10, 2005    (JP)    ............................ 2005-035015

(51) Int. Cl.
*G06K 19/06*    (2006.01)
(52) U.S. Cl. ........................ 235/492; 235/380; 235/451; 902/22; 902/24; 902/25; 902/26; 705/14; 705/41
(58) Field of Classification Search ................. 235/380, 235/451, 492; 705/14, 41; 902/22, 24–26
See application file for complete search history.

(56) References Cited

U.S. PATENT DOCUMENTS

2004/0218436 A1 * 11/2004  Guthery ...................... 365/200

2004/0249710 A1 * 12/2004  Smith et al. .................... 705/14

FOREIGN PATENT DOCUMENTS

JP    2003-044935    2/2003

* cited by examiner

*Primary Examiner*—Michael G Lee
*Assistant Examiner*—Kristy A Haupt
(74) *Attorney, Agent, or Firm*—Edwards Angell Palmer & Dodge LLP; John J. Penny, Jr.

(57) ABSTRACT

A service providing system for improving convenience of users by quickly executing a membership registration process in a system in which plural shops and groups jointly administrate its members. In the system, an external reading/writing unit stores a write data table in which provider-side data is correlated with information notification level, a portable information terminal enables the user to select the information notification level in accordance to a control of a portable terminal-side application and writes user-side data correlated with the information notification level selected by the user in the notification data table and the information notification level selected by the user to a non-contact IC. The external reading/writing unit reads the user-side data and the information notification level out of the non-contact IC, stores the user-side data and writes the provider-side data correlated with the information notification level in the write data table to the non-contact IC.

33 Claims, 13 Drawing Sheets

44

| SHOP CODE | SHOP | ADDRESS | SERVICE MEMBER ID |
|---|---|---|---|
| 0001 | XX SHOP | ×××.×× | ABC01234 |
|  |  |  | DEF21375 |
|  |  |  | ⋮ |
| 0002 | △△ SHOP | △△△.△△ | DEF21375 |
|  |  |  | PQS17632 |
|  |  |  | ⋮ |

SHOP CONTROL DATA BASE

FIG. 5

| SERVICE MEMBER ID | TERMINAL ID | MEMBER'S INFORMATION ||||||
|---|---|---|---|---|---|---|---|
| | | NAME | ADDRESS | TELEPHONE NUMBER | MAIL ADDRESS | OCCUPATION | MATTER OF INTEREST |
| AAA00001 | ○○××△△ | TARO YAMADA | ≡≡≡ | ×××-×××× | ○○○@ ××.jp | OFFICE WORKER | DRIVE, SHOPPING ... |
| AAA00002 | ××○○×× △△××× | HANAKO SUZUKI | ≡≡≡ | ○○○- ○○○○ | ×××@ ××.com | STUDENT | TOURING, SHOPPING, HEALTH |
| ... | ... | ... | ... | ... | ... | ... | ... |
| ... | ... | ... | ... | ... | ... | ... | ... |

46

CONTROL MEMBER DATABASE

F I G . 6

| SHOP MEMBER ID | SERVICE MEMBER ID | REGISTRATION STATUS | ACCUMULATED POINT | MEMBER STAGE | USABLE SERVICE | MEMBER'S INFORMATION ||| 
|---|---|---|---|---|---|---|---|---|
| | | | | | | NAME | MAIL ADDRESS | MATTER OF INTEREST |
| 0001 | AAA00001 | SECONDARY REGISTRATION COMPLETED | 45000 POINT | 1 | DISTRIBUTE MAIL OF INFORMATION ON 10% DISCOUNT SALE | TARO YAMADA | ○○○@××.jp | DRIVE, SHOPPING |
| 0002 | ABC32100 | SECONDARY REGISTRATION COMPLETED | 150 POINT | 5 | DISTRIBUTE SHOP INFORMATION | NOT ACQUIRED | ***@○○.com | NOT ACQUIRED |
| 0003 | PQR21234 | PRIMARY REGISTRATION COMPLETED | 0 POINT | 3 | DISTRIBUTE MAIL OF INFORMATION ON 5% DISCOUNT SALE | HANAKO SUZUKI | ×××@××.com | TOURING, SHOPPING, HEALTH |
| ... | ... | | | | ... | ... | ... | ... |

SHOP DATABASE

| INFORMATION NOTIFICATION LEVEL | MAIL ADDRESS | SEX | AGE | SYSTEM INFORMATION |
|---|---|---|---|---|
| 1 | NOT-NOTIFIED | NOT-NOTIFIED | NOT-NOTIFIED | NOT-NOTIFIED |
| 2 | NOT-NOTIFIED | NOT-NOTIFIED | NOT-NOTIFIED | NOTIFIED |
| 3 | NOT-NOTIFIED | NOTIFIED | NOTIFIED | NOTIFIED |
| 4 | NOTIFIED | NOTIFIED | NOTIFIED | NOTIFIED |

NOTIFICATION DATA TABLE

| INFORMATION NOTIFICATION LEVEL | PROVIDER-SIDE DATA |
|---|---|
| 1 | SHOP INFORMATION |
| 2 | SALE INFORMATION |
| 3 | 5 % DISCOUNT ELECTRONIC COUPON |
| 4 | 10 % DISCOUNT ELECTRONIC COUPON |

WRITE DATA TABLE

F I G . 9

SERVICE PROVIDING SYSTEM

CROSS REFERENCE TO RELATED APPLICATION

The present application claims priority from a Japanese Patent Application No. JP 2005-035015 filed on Feb. 10, 2005, the contents of which are incorporated herein by reference.

BACKGROUND OF THE INVENTION

1. Field of the Invention

The present invention relates to a service providing system for providing predetermined services to a user of a portable information terminal, in which a non-contact IC is built in, via the portable information terminal.

2. Related Art

Conventionally, a system for simplifying a membership registration procedure and for improving convenience of users has been proposed as disclosed in Japanese Patent Application Publication No. 2003-44935 for example in a system in which a plurality of shops and groups jointly administer its members. This system is what registers member's information in a whole member database of a server by correlating with an ID of an IC tag held by the member. In registering a new member in a shop, a reader of the shop reads the ID of the IC tag to collate to the whole member database based on the read ID. A shop terminal registers the member by obtaining the member's information from the whole member database.

The conventional system described above obtains the member's information necessary for the registration of the member from the whole member database of the server. Accordingly, there has been a problem that the member cannot be registered when the shop terminal is not connected with the server. Still more, there has been a problem even when the shop terminal is connected with the server that it takes time to register the member when traffic of the network is crowded or when the server is heavily loaded. There has been also a problem that because transmission/receiving of the member's information is concluded between the server and the shop terminal, the user is unable to select the member's information to be transmitted to the shop terminal. Furthermore, it has been unable to select information and membership registration level required by the user by the conventional system. That is, it has been unable to provide services corresponding to needs and desire of the respective users, i.e., corresponding to the membership registration levels, such as services for users who just want information on a shop and do not want to register the membership, who occasionally want information and who want to have a point service and the like.

SUMMARY OF THE INVENTION

In order to solve the above-mentioned problems, a first aspect of the invention provides, a service providing system, having a non-contact IC from/to which data can be read/written in non-contact, a portable information terminal, holding the non-contact IC, for reading/writing data from/to the non-contact IC, a portable terminal-side application, executed on the portable information terminal, for controlling reading/writing of the portable information terminal from/to the non-contact IC, an external reading/writing unit capable of reading/writing data of the non-contact IC in non-contact, and an external unit-side application, executed on the external reading/writing unit, for controlling reading/writing of the external reading/writing unit from/to the non-contact IC.

In the service providing system, the portable information terminal stores a notification data table in which information notification level that indicates a degree of user-side data which is the user-side information of the portable information terminal notified to the external reading/writing unit is correlated with the user-side data to be notified to the external reading/writing unit, the external reading/writing unit stores a write data table in which provider-side data prepared to be written from the external reading/writing unit to the non-contact IC is correlated with the information notification level, the portable information terminal enables the user to select the information notification level in accordance to the portable terminal-side application and writes the user-side data correlated with the information notification level selected by the user in the notification data table and the information notification level selected by the user to the non-contact IC and the external reading/writing unit reads the user-side data and the information notification level out of the non-contact IC when the portable information terminal approaches within a predetermined range from the external reading/writing unit, stores the user-side data read out of the non-contact IC in accordance to the external unit-side application and writes the provider-side data correlated with the information notification level read out of the non-contact IC in the write data table to the non-contact IC.

The service providing system described above allows the user to readily specify the user-side data to be notified to the external reading/writing unit by selecting the information notification level in accordance to the portable terminal-side application. The external reading/writing unit can readily obtain the user-side data corresponding to the information notification level selected by the user and in exchange for the user-side data thus obtained, can write the provider-side data corresponding to the information notification level immediately to the non-contact IC. Then, the user can receive predetermined service and the like by utilizing the provider-side data written to the non-contact IC.

In the service providing system described above, the external reading/writing unit may further store a provider code for identifying a service provider and may judge whether or not the identical provider code with the provider code stored in the external reading/writing unit is contained in the data read out of the non-contact IC, may provide predetermined member service to the user of the portable information terminal when the provider code is contained, may read the user-side data and the information notification level out of the non-contact IC when the provider code is not contained and may write the provider-side data and the provider code correlated with the information notification level read out of the non-contact IC in the write data table to the non-contact IC on condition that the user-side data read out of the non-contact IC is stored.

A second aspect of the invention provides a service providing system, having a non-contact IC from/to which data can be read/written in non-contact, a portable information terminal, holding the non-contact IC, for reading/writing data from/to the non-contact IC, a portable terminal-side application, executed on the portable information terminal, for controlling reading/writing of the portable information terminal from/to the non-contact IC, an external reading/writing unit capable of reading/writing data of the non-contact IC in non-contact, and an external unit-side application, executed on the external reading/writing unit, for controlling reading/writing of the external reading/writing unit from/to the non-contact IC. In the service providing system, the portable information terminal stores a notification data table in which information notification level that indicates a degree of user-side data which is the user-side information of the portable information terminal notified to the external reading/writing unit is correlated with the user-side data to be notified to the external reading/writing unit, the external reading/writing unit stores a write data table in which provider code for identifying a service provider, provider-side data prepared to be written from the external reading/writing unit to the non-contact IC and the information notification level are correlated from each other, the external reading/writing unit reads data out of the non-contact IC when the portable information terminal approaches within a predetermined range from the external reading/writing unit, judges whether or not the identical provider code with the provider code stored in the external reading/writing unit is contained in the data read out of the non-contact IC, provides predetermined member service to the user of the portable information terminal when the provider code is contained and transmits a start request of the portable terminal-side application and the provider code to the portable information terminal via the non-contact IC when the provider code is not contained, the portable information terminal starts the portable terminal-side application corresponding to the start request, judges whether or not the identical provider code with the provider code obtained out of the external reading/writing unit via the non-contact IC is stored in advance in a body-side memory that is a memory within the portable information terminal or in the non-contact IC in accordance to the started portable terminal-side application, enables the user of the portable information terminal to select the information notification level when the provider code is not stored in advance in the body-side memory or the non-contact IC and writes the user-side data correlated with the information notification level selected by the user in the notification data table and the information notification level selected by the user to the non-contact IC, and the external reading/writing unit reads the user-side data and the information notification level out of the non-contact IC, stores the user-side data read out of the non-contact IC in accordance to the external unit-side application and writes the provider-side data and the provider code correlated with the information notification level read out of the non-contact IC in the write data table to the non-contact IC.

The service providing system described above allows the portable terminal-side application to be started when the user holds the portable information terminal closely over the external reading/writing unit and allows the user to readily specify the user-side data to be notified to the external reading/writing unit by selecting the information notification level in accordance to the portable terminal-side application.

The external reading/writing unit can readily obtained the user-side data corresponding to the information notification level selected by the user and in exchange for the user-side data thus obtained, can write the provider-side data corresponding to the information notification level immediately to the non-contact IC. Then, the user can receive the predetermined service and the like by utilizing the provider-side data written to the non-contact IC.

In the first and second aspects of the invention, the portable information terminal may store a plurality of information notification levels corresponding to degrees of the user-side data notified to the external reading/writing unit in the notification data table and the external reading/writing unit may store the plurality of information notification levels by correlating with a plurality of types of the provider-side data, respectively, in the write data table.

Still more, the plurality of information notification levels may contain non-notified levels on which the user-side data is not notified to the external reading/writing unit and the non-notified level may be correlated with the provider-side information prepared to be written to the non-contact IC in the write data table stored in the external reading/writing unit.

In the service providing system described above, the portable information terminal may delete the user-side data stored in the non-contact IC on condition that the user-side data has been read out of the non-contact IC in accordance to the portable terminal-side application.

Alternatively, the portable information terminal may delete the user-side data stored in the non-contact IC on condition that the provider code has been written to the non-contact IC in accordance to the portable terminal-side application.

The portable information terminal may also delete the user-side data stored in the non-contact IC on condition that a predetermined time has elapsed since when the user-side data has been written to the non-contact IC in accordance to the portable terminal-side application.

Alternatively, the portable information terminal may delete the user-side data stored in the non-contact IC on condition that the portable information terminal has detected that the both of the user-side data and the provider code are stored in the non-contact IC in accordance to the portable terminal-side application.

Still more, the portable information terminal may retrieve the user-side data within the non-contact IC when the portable information terminal is started and may delete the detected user-side data out of the non-contact IC.

Alternatively, the portable information terminal may retrieve the user-side data within the non-contact IC in accordance to the portable terminal-side application when the portable terminal-side application is started and may delete the detected user-side data out of the non-contact IC.

Still more, the external reading/writing unit may delete the user-side data stored in the non-contact IC on condition that the user-side data has been read out of the non-contact IC in accordance to the external unit-side application.

Alternatively, the external reading/writing unit may delete the user-side data stored in the non-contact IC on condition that the provider code has been written to the non-contact IC in accordance to the external unit-side application.

Alternatively, the external reading/writing unit may delete the user-side data stored in the non-contact IC on condition that the external reading/writing unit has detected that the both of the user-side data and the provider code are stored in the non-contact IC in accordance to the external unit-side application.

The service providing system may further include a general control server that communicates with the portable information terminal via a radio communication network and has a general control database for storing the user-side data by correlating with the provider code, wherein the portable information terminal transmits the provider code and the user-side data written to the non-contact IC to the general control server on condition that the provider code has been written to the non-contact IC and the general control server registers the provider code and the user-side data received from the portable information terminal to the general control database by correlating them from each other.

In this case, the portable information terminal may notify the user of that the provider code has been written to the non-contact IC when the provider code has been written to the non-contact IC and may transmit the provider code written to the non-contact IC and the user-side data to the general control server on condition that the user has inputted an instruction to transmit the provider code to the general control server.

Still more, the service providing system may further include a general control server communicating with the external reading/writing unit via a radio communication network and having a general control database for storing the user-side data by correlating with the provider code, wherein the external reading/writing unit may transmit the user-side data read out of the non-contact IC and the provider code to the general control server on condition that it has written the provider code to the non-contact IC and the general control server may register the provider code and the user-side data received from the external reading/writing unit to the general control database by correlating them from each other.

Still more, the service providing system may further include a general control server communicating with the external reading/writing unit via a radio communication network and having a general control database for storing the user-side data by correlating with the provider code, wherein the external reading/writing unit may transmit the user-side data read out of the non-contact IC and the provider code to the general control server on condition that after when it has written the provider code to the non-contact IC, the portable information terminal approaches again within the predetermined range from the external reading/writing unit, and the general control server may register the provider code and the user-side data received from the external reading/writing unit to the general control database by correlating them from each other.

The general control server may transmit a notification of completion of registration indicating that the registration has been completed to the portable information terminal when the general control server has registered the provider code and the user-side data to the general control database by correlating them from each other, the portable information terminal may write the notification of completion of registration received from the general control server to the non-contact IC by correlating with the provider code related with the registration and the external reading/writing unit may write the provider-side data to the non-contact IC on condition that the data read out of the non-contact IC contains the identical provider code with the provider code stored in the external reading/writing unit and the notification of completion of registration.

Still more, the general control server may transmit a notification of completion of registration indicating that the registration has been completed to the external reading/writing unit when the general control server has registered the provider code and the user-side data to the general control database by correlating them from each other, the external reading/writing unit may store the notification of completion of registration received from the general control server by correlating with the user-side data related to the registration and the external reading/writing unit may write the provider-side data to the non-contact IC on condition that the notification of completion of registration has been stored by being correlated with the user-side data read out of the non-contact IC.

The portable information terminal may transmit updated data for updating the user-side data registered to the general control database to the general control server in accordance to the portable terminal-side application, the general control server may update the user-side data in the general control database by the updated data received from the portable information terminal and transmits the updated data to the external reading/writing unit specified by the provider code correlated with the updated user-side data and the external reading/writing unit may update the user-side data already stored by the updated data received from the general control server.

The portable information terminal may transmit updated data for updating the user-side data to the external reading/writing unit via the non-contact IC in accordance to the portable terminal-side application, the portable information terminal may transmit the updated data read out of the portable information terminal via the non-contact IC to the general control server, the general control server may update the user-side data in the general control database by the updated data received from the external reading/writing unit and may transmit the updated data to the external reading/writing unit specified by the provider code correlated with the updated user-side data and the external reading/writing unit may update the user-side data already stored by the updated data received from the general control server.

It is noted that the summary of the invention described above does not necessarily describe all necessary features of the invention. The invention may also be a sub-combination of the features described above.

BRIEF DESCRIPTION OF THE DRAWINGS

FIG. 5 is a table showing one exemplary data format of a shop general control database.

FIG. 6 is a table showing one exemplary data format of a general control member database.

FIG. 7 is a table showing one exemplary data format of a shop database.

FIG. 8 is a table showing one exemplary data format of a notification data table.

FIG. 9 is a table showing one exemplary data format of a write data table.

DETAILED DESCRIPTION OF THE INVENTION

The invention will now be described based on preferred embodiments, which do not intend to limit the scope of the invention, but exemplify the invention. All of the features and the combinations thereof described in the embodiments are not necessarily essential to the invention.

Figure 1:
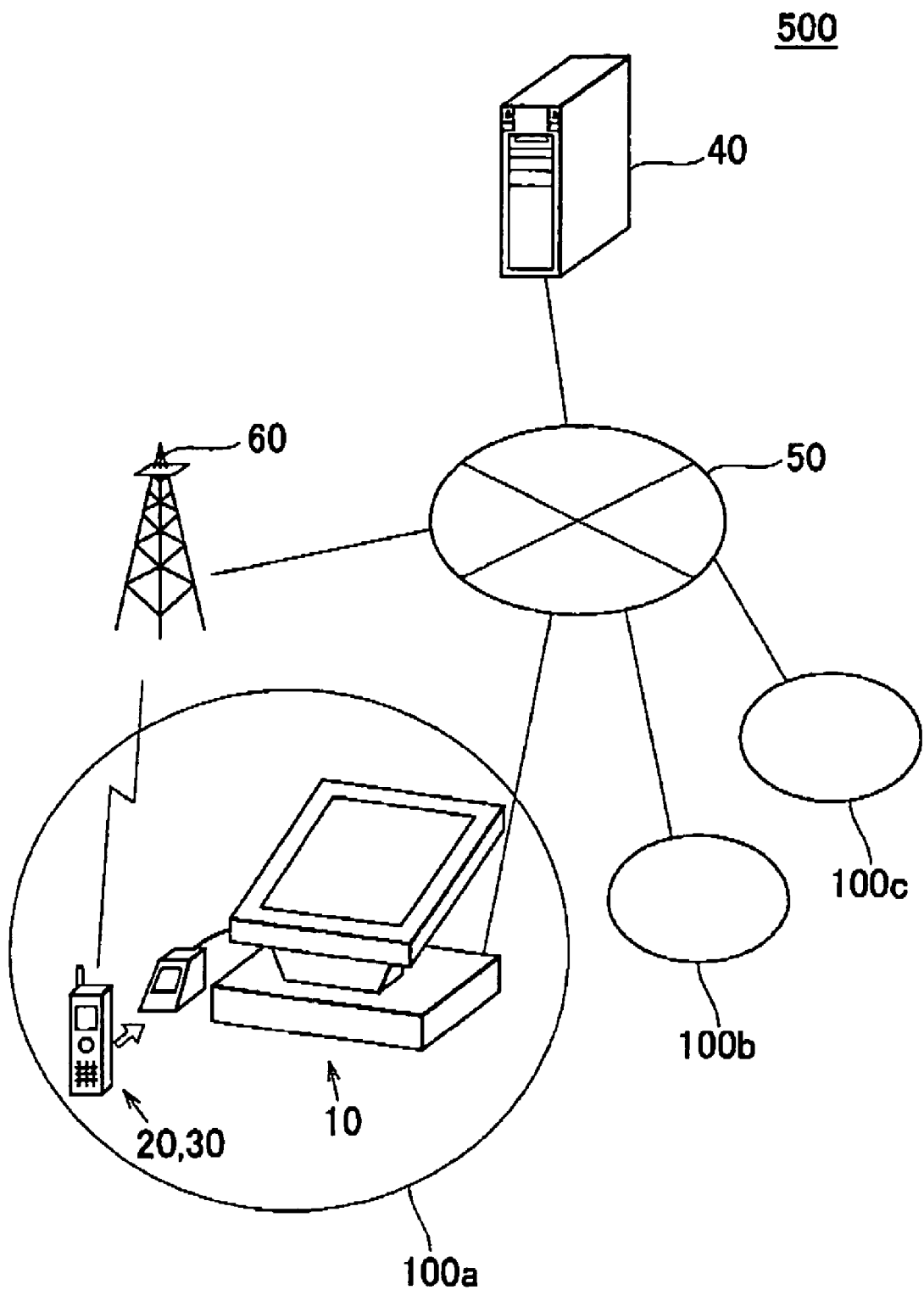
FIG. 1 is a conceptual drawing of a system configuration of a service providing system.

FIG. 1 is a conceptual drawing of a system configuration of a service providing system 500. The service providing system 500 has a general control server 40, a plurality of shop terminals 10 provided in a plurality of shops 100 and connected with the general control server 40 via a network 50, a non-contact IC 20 capable of reading/writing data in non-contact and a portable information terminal 30, holding the non-contact IC 20, for reading/writing the data from/to the non-contact IC 20. The shop terminal 10 is one example of external reading/writing units and reads/writes the data from/to the non-contact IC 20 held in the portable information terminal 30 in non-contact. The portable information terminal 30 also communicates with the general control server 40 via a radio communication network 60. A purpose of the service providing system 500 is to provide predetermined services to the user of the portable information terminal 30 via the portable information terminal 30.

An application service provider (abbreviated as ASP hereinafter) operating the service providing system 500 controls the general control server 40.

Each shop 100 applies to the ASP for the participation in the membership services. Receiving the application of the shop 100, the ASP registers the shop 100 to the general control server 40. The user registers as a service member of the service providing system 500 by transmitting member's information including own personal information and a terminal ID specifying the portable information terminal 30 to the general control server 40 from the portable information terminal 30. In registering as the service member, the portable information terminal 30 stores the member's information transmitted to the general control server 40 in a memory of the portable information terminal 30. Then, when the user hopes to be registered as a shop member of the shop 100, the user writes the member's information stored in the memory of the portable information terminal 30 to the non-contact IC 20. The shop terminal 10 registers the shop member by reading the member's information from the non-contact IC 20. The shop 100 may provide independent services to the shop member registered as the shop member per shop 100 or may provide common services together with the plurality of shops 100.

It is noted that the member's information of the present embodiment is one example of user-side data. The user may register as the shop member of the shop 100 even when the user does not register the member's information to the general control server 40.

Figure 2:
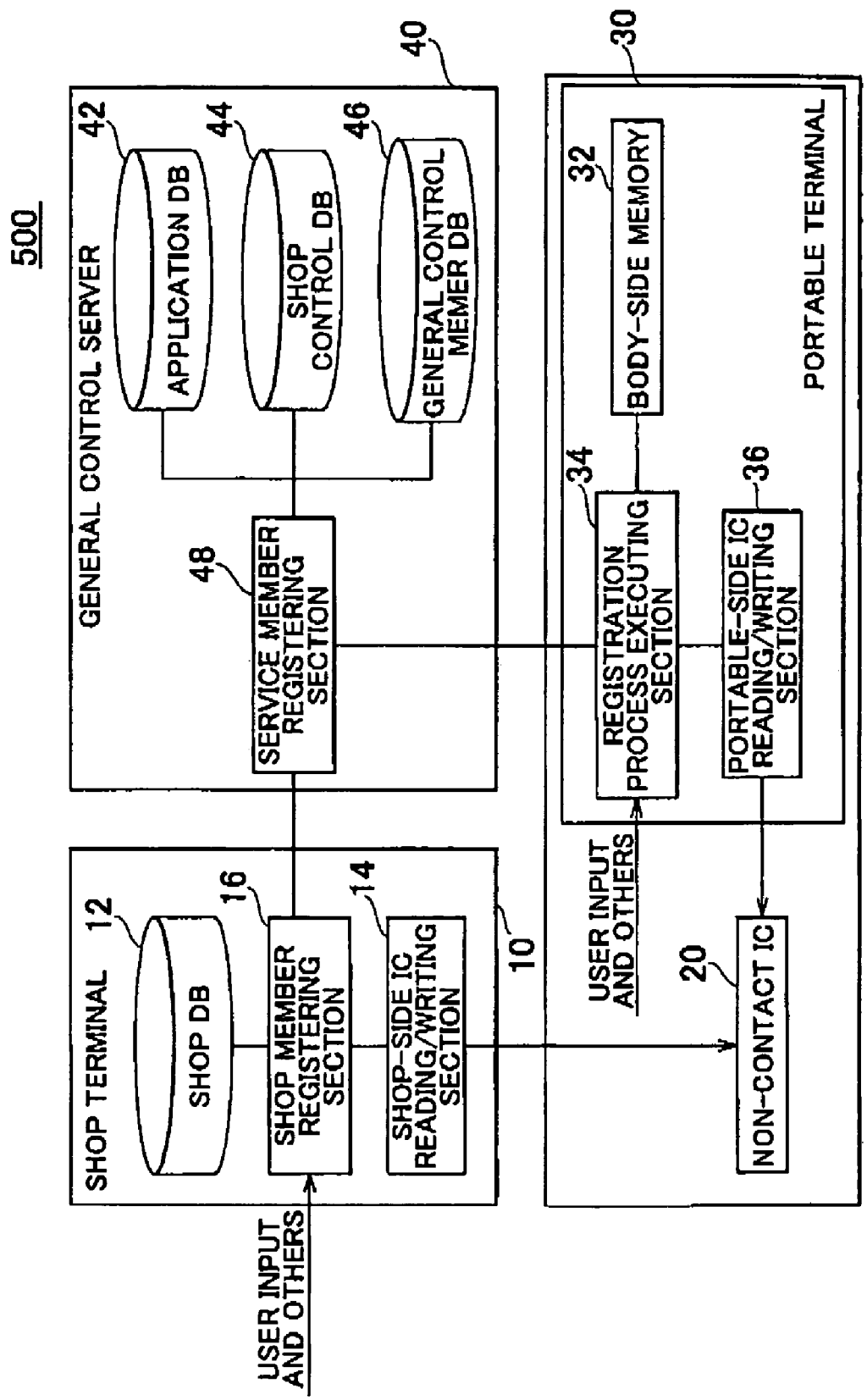
FIG. 2 is a block diagram showing a functional configuration of the service providing system.

FIG. 2 is a block diagram showing a functional configuration of the service providing system 500. As database, the general control server 40 has an application database 42, a shop general control database 44 and a general control member database 46. The application database 42 stores a shop-use application and a service utilizing application in advance by correlating with application ID codes (hereinafter called as CPID) unique to the shop-use application and to the service utilizing application.

The CPID is described in part of the shop-use application and the service utilizing application for example. It is noted that the shop-use application is one example of external unit-side applications and is a program installed in the shop terminal 10 to realize shop services to the user by enabling the shop terminal 10 to communicate with the portable information terminal 30 via the non-contact IC 20. The service utilizing application is one example of portable terminal-side applications and is a program installed in the portable information terminal 30 to realize the use of the shop services by the user by enabling the portable information terminal 30 to communicate with the shop terminal 10 via the non-contact IC 20.

The shop general control database 44 stores shop codes unique to each of the shops 100 per shop by correlating with the shop terminal 10. The shop code is one example of provider codes for identifying a service provider. The general control member database 46 stores the member's information of the members registered in the service providing system 500. When a service member registering section 48 receives the terminal ID identifying the portable information terminal 30 and the member's information that is personal information of the user from the portable information terminal 30, it issues a unique service member ID per user specified by the member's information and transmits the ID to the portable information terminal 30. The service member registering section 48 also stores the terminal ID and the member's information received from the portable information terminal 30 to the general control member database 46 by correlating with the service member ID.

The shop terminal 10 has a shop database 12, a shop member registering section 16 and a shop-side IC reading/writing section 14. The shop database 12 stores the shop-use application including the CPID and a shop code of the shop 100. The shop-side IC reading/writing section 14 reads/writes data from/to the non-contact IC 20 after detecting that the non-contact IC 20 has approached within a predetermined range and authenticating from each other. These transactions are all carried out in non-contact. The shop member registering section 16 registers the member of the shop 100 based on the data within the non-contact IC 20 read by the shop-side IC reading/writing section 14.

The portable information terminal 30 has a body-side memory 32, a registration process executing section 34 and a portable-side IC reading/writing section 36. The body-side memory 32 stores the terminal ID for identifying the portable information terminal 30, the service utilizing application described above and a registration application. The registration application is another example of the portable terminal-side applications and is a program for enabling the portable information terminal 30 to execute the membership registering process to the shop 100. The registration process executing section 34 executes the registration application stored in the body-side memory 32 and accepts inputs of member's information of the user from the outside, e.g., key inputs by the user, in accordance to the registration application. Then, it stores the inputted member's information to the body-side memory 32. The shop terminal 10 is unable to directly read/write data from/to the body-side memory 32.

The registration process executing section 34 requests to register the user of the portable information terminal 30 as the service member of the service providing system 500 by transmitting the member's information and the terminal ID stored in the body-side memory 32 to the general control server 40. Then, receiving the service member ID from the general control server 40, it writes the service member ID to the body-side memory 32. The portable-side IC reading/writing section 36 writes the service member ID received from the general control server 40 and the CPID included in the service utilizing application in the body-side memory 32 to the non-contact IC 20.

When the shop-side IC reading/writing section 14 detects the non-contact IC 20, it judges whether or not the user of the portable information terminal 30 has been registered as the shop member of the shop 100. When the shop-side IC reading/writing section 14 judges that the user of the portable information terminal 30 has not been registered as the shop member of the shop 100, it requests the portable information terminal 30 to start the registration application via the non-contact IC 20. When the registration application is started corresponding to the request of the shop terminal 10, the registration process executing section 34 writes the member's information stored in the body-side memory 32 to the non-contact IC 20. Then, the shop-side IC reading/writing section 14 reads the member's information and the service member ID written in the non-contact IC 20. The shop member registering section 16 stores the member's information and the service member ID read by the shop-side IC reading/writing section 14 to the shop database 12 by correlating them from each other.

Still more, the shop member registering section 16 causes the shop-side IC reading/writing section 14 to write the shop code stored in the shop database 12 to the non-contact IC 20. By the functional configuration described above, the service providing system 500 registers the user specified by the service member ID as the member of the shop 100.

Figure 3:
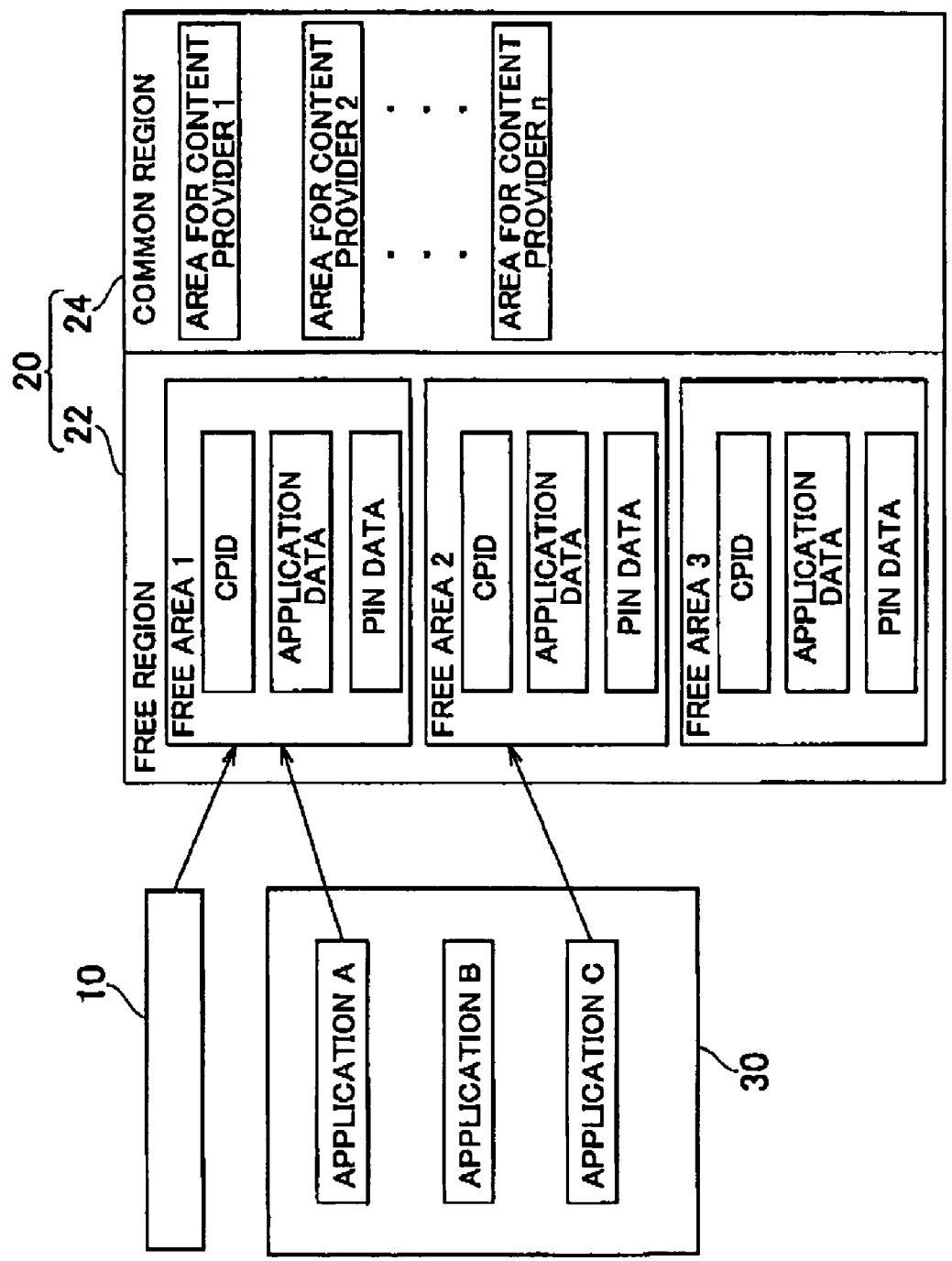
FIG. 3 is a diagram showing an internal configuration of a registration process executing section and a non-contact IC.

FIG. 3 shows applications executed in the portable information terminal 30 and an internal configuration of the non-contact IC 20. The portable information terminal 30 can execute plural types of applications. In the present embodiment, the registration application and the service utilizing applications described above are contained in one and same application, e.g., an application A. The portable information terminal 30 bearing the non-contact IC 20 transmits/receives data, i.e., writes data and calls, between the application and the non-contact IC 20, Still more, the data of the non-contact IC 20 is transmitted/received between the non-contact IC 20 and the shop terminal 10. That is, the portable information terminal 30 and the shop terminal 10 exchange data from each other by sharing the memory of the non-contact IC 20 in common. It is noted that the non-contact IC 20 can transmit/receive data to/from the shop terminal 10 even when the portable information terminal 30 is not operative.

A common region 24 and a free region 22 are preset in the memory of the non-contact IC 20. A service provider of the non-contact IC 20 administers and operates the common region 24 for the purpose of carrying a plurality of applications in one logical card. Only contents providers who have been allocated an area of the common region 24 from the service provider can use the common region 24. The contents provider registers an application using the common region 24 to the server administered by the service provider. The user downloads the application from the server and uses the service via the common region 24.

The free region 22 is an area provided for the purpose of enabling to use the function of the non-contact IC 20 even by an application not registered in the server of the service provider. A plurality of areas (referred to as a free area hereinafter) of a size set in advance in shipping the portable information terminal 30 is provided in the free region 22. A plurality of applications up to the number of free areas may use the free region 22 in one portable information terminal 30. In downloading an application, the portable information terminal 30 correlates each application with the free area in one-to-one. The CPID that uniquely identifies the application is used in correlating each application with the free area in one-to-one. The CPID is written in the application of the portable information terminal 30. The portable information terminal 30 stores the CPID in a CPID data block of each free area correlated with the application in one-to-one. The shop terminal 10 can retrieve the free area corresponding to the shop-use application by searching the free area storing the CPID coincident with the CPID of the shop-use application.

The free area also stores application data and PIN (Personal Identification Number) data. PIN is a password that can be set per free area. When the portable information terminal 30 accesses to the free region 22, it automatically collates the PIN and releases the same or password so that the free region 22 turns to be accessible. When the shop terminal 10 accesses to the non-contact IC 20, it collates and releases the PIN in accordance to a predetermined procedure. The application of the portable information terminal 30 and the shop terminal 10 share data in the application data block in the free area. After collating and releasing the PIN, the shop terminal 10 reads/writes data from/to the application data block.

It is noted that the access from the shop terminal 10 to the non-contact IC 20 and the access from the portable information terminal 30 to the non-contact IC 20 are carried out exclusively. Accordingly, even if the shop terminal 10 tries to access to the non-contact IC 20 during when the portable information terminal 30 is accessing to the non-contact IC 20, the non-contact IC 20 does not react to the shop terminal 10.

Figure 4:
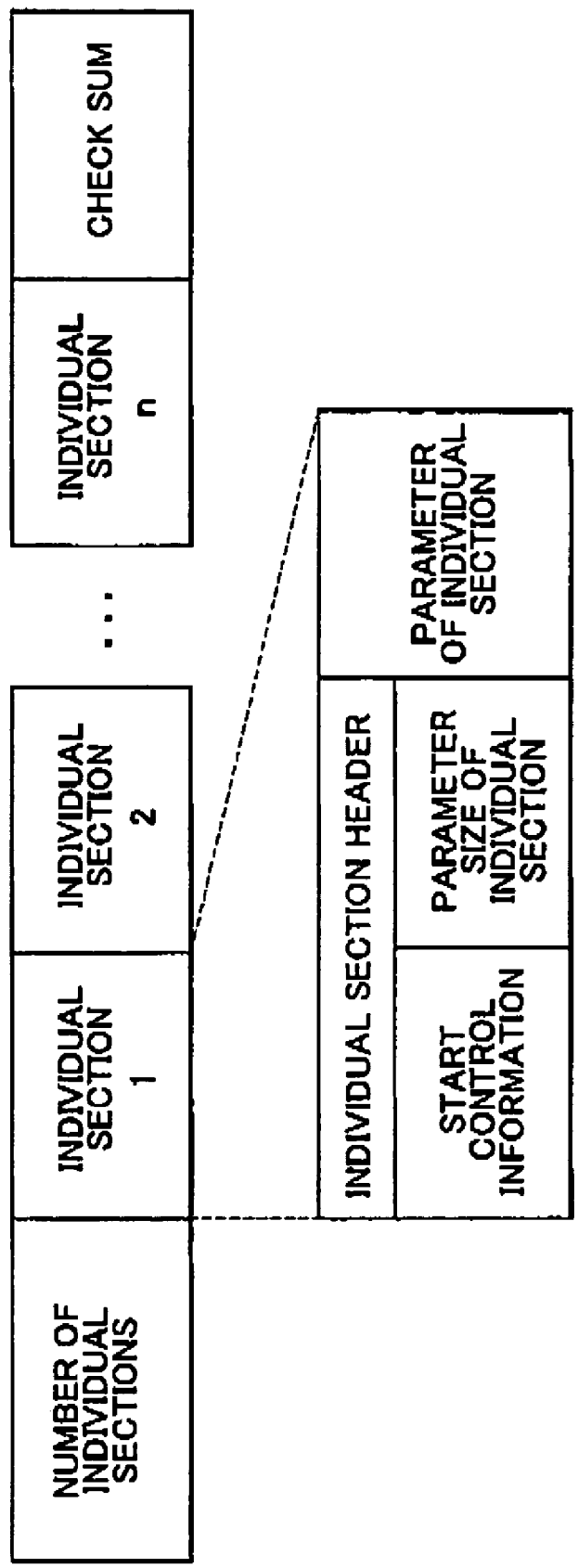
FIG. 4 is a diagram showing an outline of data format transmitted from the shop terminal to the non-contact IC.

FIG. 4 shows an outline of a data format transmitted from the shop terminal 10 to the non-contact IC 20. The following data format is that of data transmitted from the shop terminal 10 to start a specific application of the portable information terminal 30. Exemplary services realized based on such data format include starting of an application for obtaining information on the shop, coupons, peripheral regions and the like by holding the portable information terminal 30 over the shop terminal 10. The transmitted data format contains a number of individual sections, individual sections and Check Sum, which are transmitted in this order. A maximum transmittable size of the data format is 192 bytes for example.

The number of individual sections indicates a total number of the individual sections succeeding thereafter. A transmission size thereof is one byte for example. Each individual section stores information necessary for specifying a function started on the portable information terminal 30. Each individual section contains an individual section header and an individual section parameter, which are transmitted in this order. The individual section header further contains start control information and an individual section parameter size, which are transmitted in this order. The plurality of individual sections is transmitted in succession.

The start control information is one component of the individual section header and specifies one function to be started on the portable information terminal 30 per one individual section. Its transmission size is one byte for example. The function specified by the start control information is the start of the application for example. The individual section parameter size is one component of the individual section header and indicates a transmission size of the individual section parameter succeeding thereafter. Its transmission size is 2 bytes for example. The individual section parameter stores information defining a unique function started on the portable information terminal 30 out of the functions specified by the start control information. The individual section parameter includes a URL size of the application, URL of the application, a CPID size, CPID and an application starting parameter.

FIG. 5 shows one exemplary data format of the shop general control database 44. The shop general control database 44 stores the unique shop code per shop 100 by correlating with the shop 100. The shop general control database 44 also stores a network address of the shop terminal 10 provided in the shop 100 and the service member ID of the user registered as the member of that shop 100 by correlating with the shop code.

FIG. 6 shows one exemplary data format of the general control member database 46. The general control member database 46 stores the member's information of the user registered as the member of the service providing system 500 and the terminal ID received from the portable information terminal 30 of the user by correlating with the service member ID.

FIG. 7 shows one exemplary data format of the shop database 12. The shop database 12 stores the member's information read by the shop-side IC reading/writing section 14 out of the non-contact IC 20 and the service member ID by correlating them from each other. The shop database 12 stores contents of usable services different per service member ID. It also stores points corresponding to actual results of payment of fees of the user by correlating with the service member ID. Still more, the shop database 12 stores different membership stages corresponding to a quantity of stored member's information by correlating with the service member ID. Further, it stores registration status that indicates status of registration of the shop member by correlating with the service member ID. The registration status indicates whether the status of the membership registration of the shop member is provisional registration or full registration completed. The shop database 12 may store the shop member ID uniquely given to the member of the shop 100 by the shop member registering section 16 in registering the shop member by correlating with the service member ID and the member's information.

FIG. 8 shows one example of a notification data table 33 stored in the body-side memory 32 of the portable information terminal 30. The notification data table 33 stores information notification levels indicating a degree of the member's information notified to the shop terminal 10 by correlating with the member's information to be notified. It is noted that the degree of the member's information notified to the shop terminal 10 means an abundance of types of the member's information to be notified to the shop terminal 10 or a rate of highly private member's information such as a name and mail address contained in the member's information. The notification data table 33 stores a plurality of information notification levels corresponding to the degree of the member's information notified to the shop terminal 10. The plurality of information notification levels includes non-notifying levels in which no member's information is notified at all to the shop terminal 10. For example, Information Notification Level 1 in FIG. 8 is the non-notifying level in which no member's information is notified at all to the shop terminal 10.

FIG. 9 shows one example of a write data table 13 stored in the shop database 12 of the shop terminal 10. The write data table 13 stores provider-side data prepared so as to be written to the non-contact IC 20 from the shop terminal 10 and the information notification levels by correlating them from each other. In the write data table 13, the shop terminal 10 stores a plurality of types of provider-side data by correlating with the plurality of information notification levels, respectively. For example, the information notification level of higher degree of member's information notified to the shop terminal 10 is correlated with the provider-side data advantageous to the user. The shop's information that is provider-side information prepared so as to be written to the non-contact IC 20 is correlated with the non-notified level among the plurality of information notification levels, i.e., with Information Notification Level 1 of the present embodiment. The shop terminal 10 can change the provider-side data to be correlated with each of the information notification levels.

Figure 10:
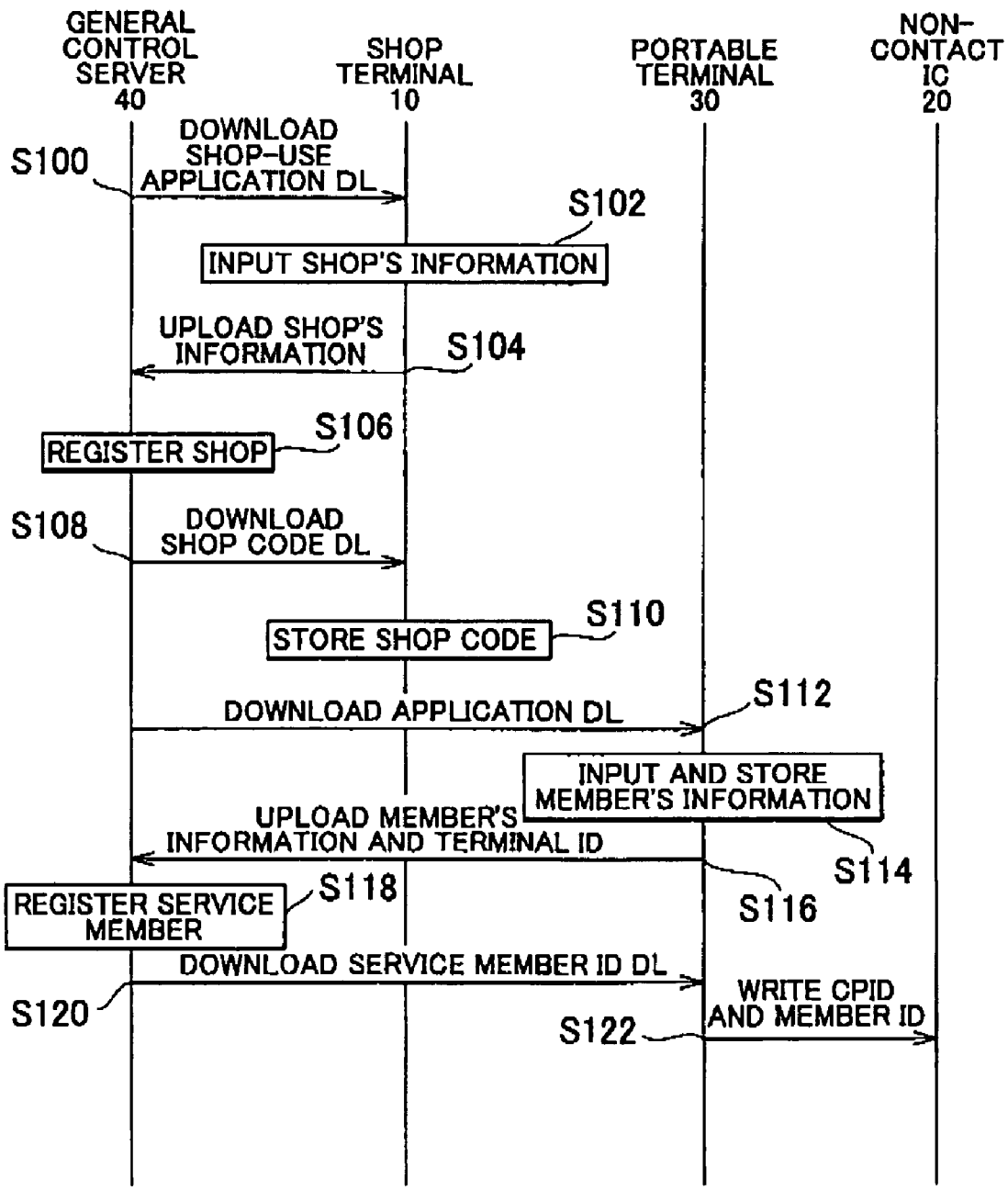
FIG. 10 is a flowchart showing steps for registering the shop terminal and the portable information terminal to the general control server.

FIG. 10 is a flowchart showing steps for registering the shop terminal 10 and the portable information terminal 30 to the general control server 40 as an initial registration. At first, in the shop terminal 10, the shop member registering section 16 downloads the shop-use application containing the CPID from the general control server 40 and stores in the shop database 12 (S100).

In another embodiment, the shop database 12 may store the shop-use application containing the CPID in advance in shipping the shop terminal 10. Alternatively, the shop-use application containing the CPID may be provided by means of a recording medium such as a CD-ROM and be installed to the shop database 12 after the shipment of the shop terminal 10.

The shop member registering section 16 of the shop terminal 10 receives inputs of shop's information such as the name and network address of the shop from the outside (S102) and uploads the inputted shop's information to the general control server 40 (S104). In the general control server 40, the service member registering section 48 issues a shop code unique to the shop 100 based on the shop's information received from the shop terminal 10 and stores it in the shop general control database 44 by correlating the shop's information with the shop code. Thereby, the shop is registered (S106). The general control server 40 transmits the shop code assigned to the shop 100 in the registration of the shop terminal 10 to the shop terminal 10 (S108). Then, in the shop terminal 10, the shop member registering section 16 downloads the shop code assigned to the shop 100 from the general control server 40 and stores it in the shop database 12 (S110).

In the portable information terminal 30, the registration process executing section 34 downloads the service utilizing application containing the CPID from the general control server 40 and stores it in the body-side memory 32 (S112).

According to another embodiment, the portable information terminal 30 may store the service utilizing application containing the CPID in the body-side memory 32 in advance at the time of its shipment. Or, the portable information terminal 30 may obtain the service utilizing application containing the CPID through a personal computer (not shown) into which it has been downloaded via Internet or through cable communications, infrared communications or short-range radio communications such as Bluetooth (registered trade mark).

Still more, the portable information terminal 30 may obtain the service utilizing application containing the CPID via the shop terminal 10 and store it in the body-side memory 32. The registration process executing section 34 also obtains the registration application for enabling the portable information terminal 30 to execute the process for registering the membership to the shop 100 from the general control server 40 and stores it in the body-side memory 32. The registration application may be included in the service utilizing application.

The registration process executing section 34 executes the registration application stored in the body-side memory 32, accepts inputs of the member's information of the user by means of key-input in accordance to the registration application and stores the inputted member's information in the body-side memory 32 (S114). Then, the registration process executing section 34 uploads the member's information and the terminal ID stored in the body-side memory 32 to the general control server 40 (S116). When the general control server 40 receives the member's information that is personal information of the user from the portable information terminal 30, the service member registering section 48 issues a unique service member ID per user specified by the member's information. Then, it registers the user as a service member by storing the member's information received from the portable information terminal 30 in the general control member database 46 by correlating with the service member ID (S118). The service member registering section 48 transmits the issued service member ID to the portable information terminal 30 of the user (S120). In the portable information terminal 30, the registration process executing section 34 stores the service member ID received from the general control server 40 in the body-side memory 32 and writes the CPID of the application and the service member ID stored in the body-side memory 32 to the non-contact IC 20 (S122). Thus, this flow ends.

Figure 11:
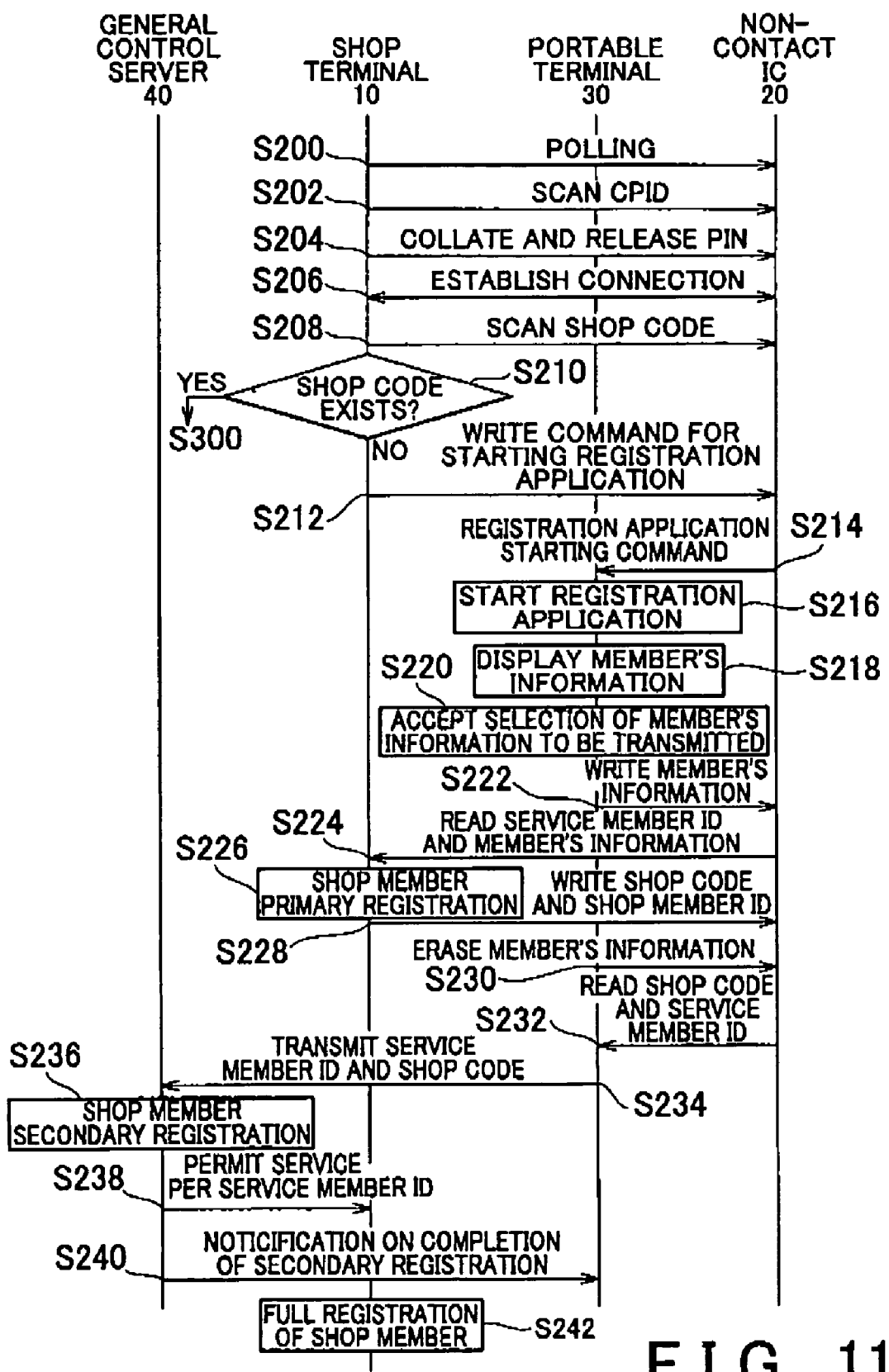
FIG. 11 is a flowchart showing steps for registering a shop member.

FIG. 11 is a flowchart showing steps for registering a shop member in the shop 100. At first, the shop-side IC reading/ writing section 14 of the shop terminal 10 polls the non-contact IC 20, i.e., it detects that the non-contact IC 20 has approached within a predetermined range (S200). The detectable range of the shop-side IC reading/writing section 14 for detecting the non-contact IC 20 is about 10 cm for example. Then, the shop-side IC reading/writing section 14 retrieves the identical CPID with the CPID stored in the shop database 12 within the non-contact IC 20 (S202). When the shop-side IC reading/writing section 14 detects the identical CPID with the CPID stored in the shop database 12 within the non-contact IC 20, it collates and releases the PIN in succession (S204). Then, when the shop-side IC reading/writing section 14 releases the PIN and establishes the connection with the non-contact IC 20 (S206), it scans the identical shop code with the shop code stored in the shop database 12 within the non-contact IC 20 (S208) to judge whether or not that shop code is stored within the non-contact IC 20 (S210).

When the shop code stored in the shop database 12 is stored within the non-contact IC 20 in Step S210, the process advances to Step S300. When the shop code stored in the shop database 12 is not stored within the non-contact IC 20 in contrary, the shop-side IC reading/writing section 14 writes a start command requesting to start the registration application to the non-contact IC 20 (S212). Then, in the portable information terminal 30, the portable-side IC reading/writing section 36 detects that the start command of the registration application has been written to the non-contact IC 20 (S214). When the start command of the registration application has been written to the non-contact IC 20, the registration process executing section 34 reads the registration application out of the body-side memory 32 and executes it (S216). The registration process executing section 34 displays all of the member's information stored in the body-side memory 32 in accordance to the registration application (S218) and enables the user to select member's information, among the member's information, to be provided to the shop terminal 10 (S220). The portable-side IC reading/writing section 36 writes the member's information selected by the user as the member's information to be provided to the shop terminal 10 to the non-contact IC (5222).

In the shop terminal 10, the shop-side IC reading/writing section 14 reads the member's information and the service member ID written to the non-contact IC 20 by the portable-side IC reading/writing section 36 (S224). The shop member registering section 16 issues a shop member ID identifying the member of the shop 100 based on the member's information and the service member ID read by the shop-side IC reading/writing section 14 and stores the shop member ID, the service member ID and the member's information in the shop database 12 by correlating them from each other. Thus, the shop member registering section 16 primarily registers the user specified by the shop member ID or the service member ID as the member of the shop 100 (S226).

On the condition that the user of the non-contact IC 20 has been primarily registered as the member of the shop 100, the shop-side IC reading/writing section 14 writes the shop member ID of the user and the shop code stored in the shop database 12 to the non-contact IC 20 (S228). When a new shop code is written to the non-contact IC 20, the portable-side IC reading/writing section 36 erases the member's information stored in the non-contact IC 20 (S230). Alternatively, the user-side data stored in the non-contact IC 20 may be deleted on condition that the shop terminal 10 has written the shop code to the non-contact IC 20.

Still more, the shop terminal 10 may delete the member's information stored in the non-contact IC 20 on condition that it has read the member's information out of the non-contact IC 20. Alternatively, the shop terminal 10 may delete the member's information stored in the non-contact IC 20 on condition that it detects that the both of the member's information and the shop code are stored within the non-contact IC 20. When the primary registration of the shop member is completed, the shop terminal 10 changes the registration status correlated with the service member ID in the primary registration in the shop database 12 to "Primary Registration Completed".

After primarily registering the user to the shop terminal 10 as the shop member of the shop 100, the service providing system 500 notifies the contents of the primary registration to the general control server 40. When the content of the primary registration is adequate, the general control server 40 secondarily registers the user to the general control server 40 as the shop member of the shop 100. The following flow shows steps for secondarily registering the shop member. It is noted that the secondary registration may be executed at arbitrary timing after the primary registration. Or, a plurality of secondary registrations may be executed altogether on an occasion when a number of primary registrations reaches to a certain number. In the secondary registration, the portable-side IC reading/writing section 36 detects that the shop code is newly written to the non-contact IC 20 (322B). When the shop code is newly written to the non-contact IC 20, the portable-side IC reading/writing section 36 reads the service member ID stored in advance and the shop code newly written out of the non-contact IC 20 and stores them in the body-side memory 32 (S232). The registration process executing section 34 confirms the user whether or not the newly written shop code should be transmitted to the general control server 40 and transmits the shop code and the service member ID already stored in the body-side memory 32 to the general control server 40 via the radio communication network 60 by correlating them from each other on condition that an instruction that instructs to transmit the shop code to the general control server 40 is inputted (S234).

In the general control server 40, the service member registering section 4B confirms that the service member ID and the shop code received from the portable information terminal 30 are adequate. For example, it confirms that the service member ID received from the portable information terminal 30 is stored in the general control member database 46. It also confirms that the shop code received from the portable information terminal 30 is stored in the shop general control database 44. When the service member ID and the shop code received from the portable information terminal 30 are adequate, the service member registering section 48 stores the service member ID in the shop general control database 44 by correlating with the shop code. Thus, the service member registering section 48 secondarily registers the use specified by the service member ID as the shop member of the shop 100 specified by the shop code (S236).

Although the portable information terminal 30 has transmitted the information related to the primary registration to the general control server 40 in the embodiment described above, the shop terminal 10 may also transmit the information related to the primary registration to the general control server 40 instead. For example, the shop terminal 10 may transmit the member's information and the shop code of the shop terminal 10 read out of the non-contact IC 20 to the general control server 40 on condition that it has written the shop code to the non-contact IC 20. Or, the shop terminal 10 may transmit the member's information and the shop code read out of the non-contact IC 20 to the general control server 40 on condition that the portable information terminal 30 holding the non-contact IC 20 approaches again within the predetermined range from the shop terminal 10 after writing the shop code to the non-contact IC 20. The general control server 40 registers the shop code and the member's information received from the shop terminal 10 in the shop general control database 44 and the general control member database 46 by correlating them from each other.

When the new secondary registration is completed, the service member registering section 48 permits the shop terminal 10 specified by the shop code in that secondary registration to provide shop service to the member specified by the service member ID in the secondary registration (S238). The service member registering section 48 notifies the portable information terminal 30 specified by the service member ID in the secondary registration of that the secondary registration of the shop member has been completed (S240). For example, it reads the shop name of the shop 100 specified by the shop code in the secondary registration out of the shop general control database 44 and reads the mail address of the portable information terminal 30 specified by the service member ID out of the general control member database 46. Then, it transmits the message containing the shop name of the shop 100 and notifying that the secondary registration has been completed to the mail address read out of the general control member database 46.

When the service member registering section 48 has registered the member's information and the shop code to the general control database by correlating them from each other, it may transmit a notification of completion of registration indicating that the registration has been completed to the portable information terminal 30. In this case, the portable information terminal 30 writes the notification of completion of registration received from the general control server 40 to the non-contact IC 20 by correlating with the shop code related to that registration. The shop terminal 10 may write the provider-side data to the non-contact IC 20 on condition that the identical shop code with the shop code stored in the shop database 12 and the notification of completion of registration described above are stored in the data read out of the non-contact IC 20.

When the secondary registration in the general control server 40 is completed, the shop terminal 10 changes the registration status correlated with the service member ID in the secondary registration in the shop database 12 to "Secondary Registration Completed" (S242). It is noted that although the service member ID has been used in order to specify the user in the embodiment described above, the terminal ID such as MAC address of the portable information terminal 30 may specify the user instead of that. In this case, the service member registering section 48 does not issue the service member ID in the registration of service member shown in FIG. 10.

According to the procedure for registering the shop member described above, the member's information stored in the body-side memory 32 is provided to the shop terminal 10 via the non-contact IC 20 only when the shop terminal 10 and the portable information terminal 30 store the applications containing the identical CPID in registering the member of the shop 100. Accordingly, the user can save time for registering the membership in the shop 100.

Still more, because the member's information is stored in the body-side memory 32 which cannot be read directly from the shop terminal 10, the security of the member's information is assured. Furthermore, only the member's information selected by the user as the member's information to be provided to the shop terminal 10 may be transmitted to the portable information terminal 30 via the non-contact IC 20, The service providing system 500 can provide the predetermined services to the user of the portable information terminal 30 even in an environment in which the general control server 40 does not communicate with the shop terminal 10 and the portable information terminal 30. Examples of such operation will be explained below. At first, the registration process executing section 34 starts the portable terminal-side application corresponding to manipulation of the user. The registration process executing section 34 enables the user to select information notification level in accordance to controls of the started portable terminal-side application. In this case, the registration process executing section 34 reads the notification data table 33 exemplified in FIG. 8 out of the body-side memory 32 and displays it on a screen. Then, the user can select the information notification level while confirming the notification data table 33 displayed on the screen. The registration process executing section 34 reads the member's information correlated with the information notification level selected by the user out of the notification data table 33. Then, it writes the read member's information and the information notification level selected by the user to the non-contact IC 20. When the portable information terminal 30 approaches within the predetermined range from the shop terminal 10, the shop-side IC reading/writing section 14 in the shop terminal 10 reads the member's information and the information notification level out of the non-contact IC 20. Then, the shop-side IC reading/writing section 14 stores the member's information read out of the non-contact IC 20 to the shop database 12 in accordance to the external unit-side application and writes the provider-side data correlated with the information notification level read out of the non-contact IC 20 in the write data table 13 to the non-contact IC 20.

According to the present embodiment, the user can readily specify the member's information to be notified to the shop terminal 10 by selecting the information notification level corresponding to the portable terminal-side application. Thus, the shop terminal 10 can readily obtain the member's information corresponding to the information notification level selected by the user and in exchange for the member's information thus obtained, the shop terminal 10 can write the provider-side data corresponding to the information notification level immediately to the non-contact IC 20. The user can quickly receive the predetermined services and the like by using the provider-side data written to the non-contact IC 20.

The shop terminal 10 judges whether or not the identical shop code with the shop code stored in the shop database 12 is contained in the data read out of the non-contact IC 20 and provides the predetermined member services to the user of the portable information terminal 30 when that shop code is contained. Meanwhile, when the shop code described above is not contained, the shop terminal 10 reads the member's information and information notification level out of the non-contact IC 20 and writes the provider-side data correlated with the information notification level read out of the non-contact IC 20 in the write data table 13 and the shop code of the shop terminal 10 to the non-contact IC 20 on condition that the member's information read out as described above is registered to the shop database 12.

In the embodiment described above, the shop terminal 10 may start the portable terminal-side application via the non-contact IC 20. An example of the operation in this case will be described below. At first, when the portable information terminal 30 approaches within the predetermined range from the shop terminal 10, the shop terminal 10 reads data out of the non-contact IC 20 and judges whether or not the identical shop code with the shop code stored in the shop terminal 10 is contained in the read data. When the shop code described above is contained in the data read out of the non-contact IC 20, the shop terminal 10 provides the predetermined member services to the user of the portable information terminal 30 by writing the provider-side information such as electronic coupons to the non-contact IC 20. When the shop code described above is not contained in the data read out of the non-contact IC 20, the shop terminal 10 transmits the shop code stored in the shop terminal 10 and a request for starting the portable terminal-side application to the portable information terminal 30 via the non-contact IC 20.

The portable information terminal 30 starts the portable terminal-side application corresponding to the start request received from the shop terminal 10 via the non-contact IC 20 and judges whether or not the identical shop code with the shop code obtained from the shop terminal 10 via the non-contact IC 20 is stored in advance in the body-side memory 32 or the non-contact IC 20 in accordance to the portable terminal-side application started as described above. When the shop code described above is not contained in advance in the body-side memory 32 or the non-contact IC 20, the portable information terminal 30 causes the user to select an information notification level. Then, the portable information terminal 30 writes the member's information correlated with the information notification level selected by the user in the notification data table 33 and the information notification level selected by the user to the non-contact IC 20. The shop terminal 10 reads the member's information and the information notification level written to the non-contact IC 20 and stores the read member's information in accordance to the external unit-side application. Still more, the shop terminal 10 writes the provider-side data correlated with the information notification level read out of the non-contact IC 20 in the write data table 13 and the shop code stored in the shop database 12 to the non-contact IC 20.

According to the present embodiment, the portable terminal-side application is started on an occasion when the user brings the portable information terminal 30 closer to the shop terminal 10 and the user can readily specify the member's information to be notified to the shop terminal 10 by selecting the information notification level corresponding to the portable terminal-side application. The shop terminal 10 can also readily obtain the member's information corresponding to the information notification level selected by the user and in exchange for the obtained member's information, can write the provider-side data corresponding to the information notification level immediately to the non-contact IC 20. Then, the user can quickly receive the predetermined services and the like by using the provider-side data written to the non-contact IC 20.

It is noted that the portable information terminal 30 can delete the member's information stored in the non-contact IC 20 in accordance to the portable terminal-side application on condition that the member's information has been read out of the non-contact IC 20. Or, the portable information terminal 30 may delete the member's information stored in the non-contact IC 20 on condition that the shop code has been written to the non-contact IC 20. Still more, it may delete the member's information stored in the non-contact IC 20 on condition that a predetermined time has elapsed since when the member's information has been written to the non-contact IC 20. Or, the portable information terminal 30 may delete the member's information stored in the non-contact IC 20 on condition that it has detected that the both of the member's information and the shop code are stored in the non-contact IC 20.

Alternatively, the portable information terminal 30 may retrieve the member's information within the non-contact IC 20 when the portable information terminal 30 is started and may delete the detected member's information from the non-contact IC 20. Alternatively, when the portable terminal-side application is started, the portable information terminal 30 may retrieve the member's information within the non-contact IC 20 in accordance to the portable terminal-side application and may delete the detected member's information from the non-contact IC 20.

Figure 12:
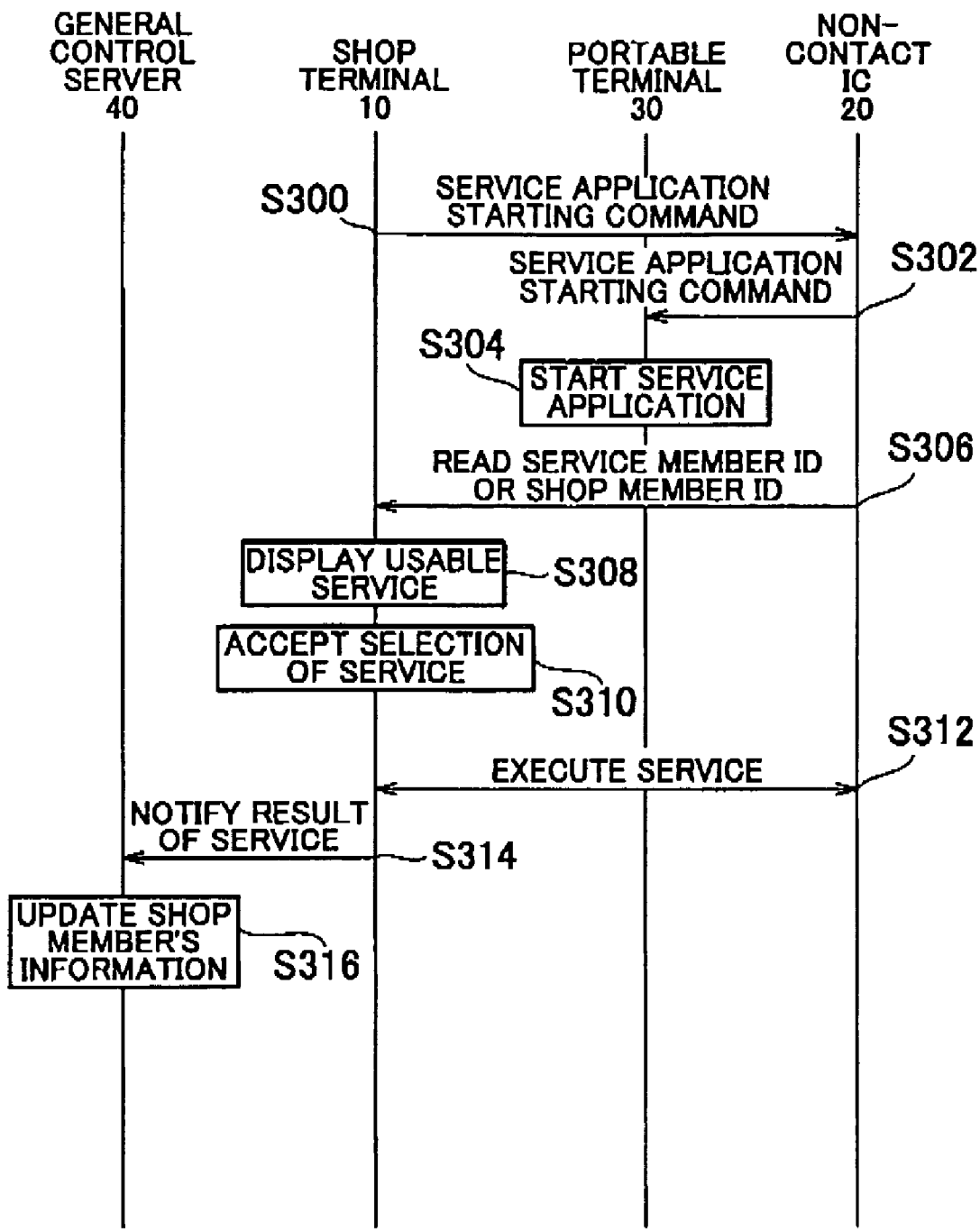
FIG. 12 is a flowchart showing steps for using shop service.

FIG. 12 is a flowchart showing one exemplary procedure for using the shop service in the service providing system 500. This flowchart shows a flow continuing from Steps S200 through 210 explained in FIG. 11. The operational steps from Steps S200 through S210 have been described above, so that their explanation will be omitted here. When the shop terminal 10 detects the identical shop code with the shop code stored in the shop database 12 within the non-contact IC 20 in Step 5210, the shop-side IC reading/writing section 14 writes a start command for requesting the start of the service utilizing application to the non-contact IC 20 (S300).

In Step 300, on condition that the shop-side IC reading/writing section 14 reads the service member ID out of the non-contact IC 20 and detects the identical service member ID with the service member ID read out of the non-contact IC 20 within the shop database 12, the shop-side IC reading/writing section 14 may write the start command for requesting the non-contact IC 20 to start the service utilizing application to the non-contact IC 20. In the portable information terminal 30, the portable-side IC reading/writing section 36 detects that the start command of the service utilizing application is written to the non-contact IC 20 (S302). When the start command of the service utilizing application is written to the non-contact IC 20, the registration process executing section 34 reads the service utilizing application out of the body-side memory 32 and starts it (S304). Because the shop service is provided on condition that the user of the portable information terminal 30 is registered as the member to the shop terminal 10 in this case, the security of the shop service is improved.

In the shop terminal 10, the shop-side IC reading/writing section 14 reads the service member ID or the shop member ID out of the non-contact IC 20 in accordance to the shop-use application (S306). The shop member registering section 16 reads the usable service correlated with the service member ID or the shop member ID read out of the non-contact IC 20 out of the shop database 12 and displays it (S308). The shop member registering section 16 accepts a selection of service, which the member desires to use, among the usable services (S310). When the shop member registering section 16 accepts the selection of service, it executes the shop service to the shop member by communicating with the portable information terminal 30 while sharing the memory of the non-contact IC 20 (5312).

When the registration status of the service member ID is that of Primary Registration Completed, the shop member registering section 16 enables the user to use only limited services as compared to that of Full Registration Completed. In case of the status of Primary Registration Completed for example, the services are restricted so that the user cannot use coupon such as discount while enabling the user to use the services such as distributed shop information. Or, in case of the status of Primary Registration Completed, an upper limit may be set for a number of times of use of the shop service. When the use of the shop service reaches the upper limit, a message for urging the secondary registration may be outputted to the shop terminal 10 or to the portable information terminal 30, It allows the system to urge the user to register to the general control server 40. Accordingly, it allows the general control server 40 to accurately seize the status of registration of member to the shop terminal 10.

The shop terminal 10 reads an accumulated number of points per service member ID out of the shop database 12 and provides contents of service corresponding to the accumulated number of points. Based on the actual result of services executed in Step 312, the shop member registering section 16 updates the accumulated points and the membership stage specified by the service member ID or the shop member ID. For example, the shop member registering section 16 accumulates the points corresponding to the fee payment result of the user in the shop database 12 by correlating with the service member ID.

The shop member registering section 16 notifies the actual result of the service executed in Step 312 to the general control server 40 by correlating with the service member ID or the shop member ID (S314). The general control server 40 stores and updates the actual result of service notified from the shop terminal 10 in the shop general control database 44 or the general control member database 46 by correlating with the service member ID or the shop member ID (S316). Thus, this flow ends.

Figure 13:
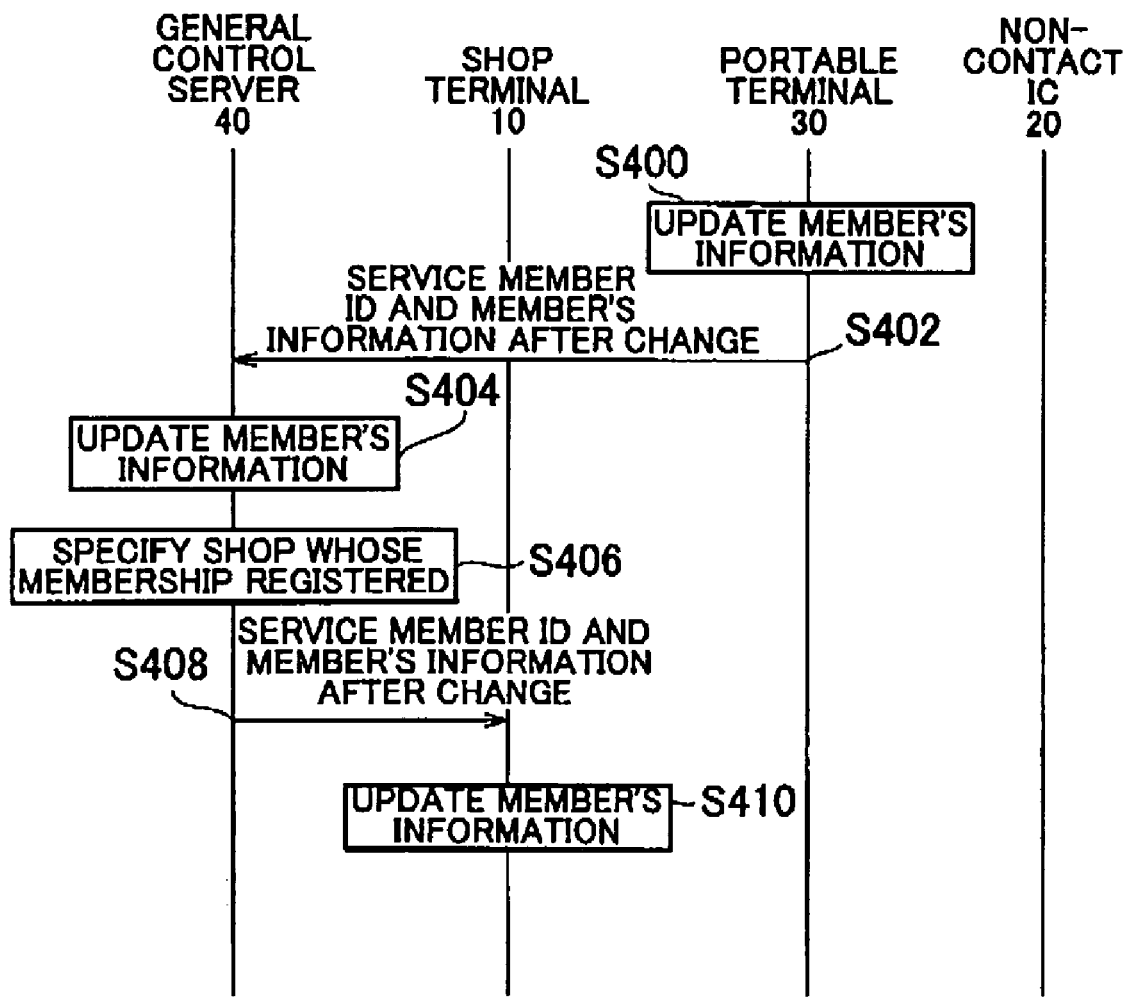
FIG. 13 is a flowchart showing steps for updating member's information.

FIG. 13 is a flowchart showing a procedure when the service providing system 500 changes the member's information. At first, in the portable information terminal 30, the registration process executing section 34 accepts a change of the member's information stored in the body-side memory 32 (S400). When the registration process executing section 34 accepts the change of the member's information, it transmits the service member ID stored in the body-side memory 32 and the member's information after the change to the general control server 40 (S402). Then, in the general control server 40, the service member registering section 48 updates the member's information already stored in the general control member database 46 by being correlated with the service member ID received from the portable information terminal 30 with the member's information after the change received from the portable information terminal 30 (S404).

The service member registering section 48 also reads a plurality of shop codes stored in the shop general control database 44 by being correlated with the service member ID received from the portable information terminal 30 (S406). Then, the service member registering section 48 transmits the member's information after the change and the service member ID to each network address of the plurality of shop terminals 10 specified by the plurality of read shop codes by correlating them from each other (S408). The shop member registering section 16 updates the member's information already stored in the shop database 12 by being correlated with the service member ID received from the general control server 40 with the member's information after the change received from the general control server 40 (S410).

In Step 406, the service member registering section 48 may transmit the plurality of shop names and the shop codes stored in the shop general control database 44 by being correlated with the service member ID received from the portable information terminal 30 to the portable information terminal 30 and may accept the selection of shop for which the member's information has to be updated through the portable information terminal 30. In this case, the service member registering section 48 transmits the member's information after the change and the service member ID to the network address of the shop selected as the shop whose member's information has to be updated by correlating them from each other in Step 408. The operational steps described above allow the member's information stored in the shop terminal 10 of the plurality of shops 100 to be efficiently updated.

It is noted that although the updated data of the member's information has been directly transmitted from the portable information terminal 30 to the general control server 40 in the embodiment described above, the portable information terminal 30 may transmit the updated data to the shop terminal 10 instead of that. That is, the portable information terminal 30 transmits the updated data of the member's information to the shop terminal 10 via the non-contact IC 20 in accordance to the portable terminal-side application. The shop terminal 10 transmits the updated data read out of the portable information terminal 30 via the non-contact IC 20 to the general control server 40. Then, the general control server 40 updates the member's information in the general control database by the updated data received from the shop terminal 10 and transmits the updated data to the plurality of shop terminals 10 specified by the shop codes correlated with the updated member's information. The shop terminal 10 that has received the updated data of the member's information updates the member's information already stored by the updated data received from the general control server 40.

As it is apparent from the above description, the present embodiment allows the service provider to quickly provide the services of the provision of shop's information, of membership registration procedure and the like and allows the convenience of the user to be improved.

Although the invention has been described by way of the exemplary embodiments, it should be understood that those skilled in the art might make many changes and substitutions without departing from the spirit and scope of the invention.

It is obvious from the definition of the appended claims that the embodiments with such modifications also belong to the scope of the invention.

What is claimed is:

1. A service providing system, comprising:
a non-contact IC from/to which data can be read/written in non-contact;
a portable information terminal, holding said non-contact IC, for reading/writing data from/to said non-contact IC;
a portable terminal-side application, executed on said portable information terminal, for controlling reading/writing of said portable information terminal from/to said non-contact IC;
an external reading/writing unit capable of reading/writing data of said non-contact IC in non-contact;
an external unit-side application, executed on said external reading/writing unit, for controlling reading/writing of said external reading/writing unit from/to said non-contact IC; and
a general control server that communicates with said portable information terminal via a radio communication network and has a general control database for storing said user-side data by correlating with said write data table of said external reading/writing unit,
wherein
said portable information terminal stores a notification data table in which an information notification level that indicates a degree of user-side data which is the user-side information of said portable information terminal notified to said external reading/writing unit is correlated with said user-side data to be notified to said external reading/writing unit,
said external reading/writing unit stores a write data table in which provider-side data prepared to be written from said external reading/writing unit to said non-contact IC is correlated with said information notification level, said portable information terminal enables said user to select said information notification level in accordance to said portable terminal-side application and writes said user-side data correlated with said information notification level selected by said user in said notification data table and said information notification level selected by said user to said non-contact IC, and said external reading/writing unit reads said user-side data and said information notification level out of said non-contact IC when said portable information terminal approaches within a predetermined range from said external reading/writing unit, stores said user-side data read out of said non-contact IC in accordance to said external unit-side application, and writes said provider-side data correlated with said information notification level read out of said non-contact IC in said write data table to said non-contact IC.

2. The service providing system as set forth in claim 1, wherein said external reading/writing unit further stores a provider code for identifying a service provider and judges whether or not the identical provider code with said provider code stored in said external reading/writing unit is contained in said data read out of said non-contact IC, provides predetermined member service to the user of said portable information terminal when said provider code is contained, reads said user-side data and said information notification level out of said non-contact IC when said provider code is not contained and writes said provider-side data and said provider code correlated with said information notification level read out of said non-contact IC in said write data table to said non-contact IC on condition that said user-side data read out of said non-contact IC is stored.

3. The service providing system as set forth in claim 2, wherein said portable information terminal deletes said user-side data stored in said non-contact IC on condition that said provider code has been written to said non-contact IC in accordance to said portable terminal-side application.

4. The service providing system as set forth in claim 2, wherein said portable information terminal deletes said user-side data stored in said non-contact IC on condition that said portable information terminal has detected that both said user-side data and said provider code are stored in said non-contact IC in accordance to said portable terminal-side application.

5. The service providing system as set forth in claim 2, wherein said external reading/writing unit deletes said user-side data stored in said non-contact IC on condition that said provider code has been written to said non-contact IC in accordance to said external unit-side application.

6. The service providing system as set forth in claim 2, wherein said external reading/writing unit deletes said user-side data stored in said non-contact IC on condition that said external reading/writing unit has detected that both said user-side data and said provider code are stored in said non-contact IC in accordance to said external unit-side application.

7. The service providing system as set forth in claim 2, further comprising a general control server communicating with said external reading/writing unit via a radio communication network and having a general control database for storing said user-side data by correlating with said provider code, wherein said external reading/writing unit transmits said user-side data read out of said non-contact IC and said provider code to said general control server on condition that it has written said provider code to said non-contact IC, and said general control server registers said provider code and said user-side data received from said external reading/writing unit to said general control database by correlating them with each other.

8. The service providing system as set forth in claim 2, further comprising a general control server communicating with said external reading/writing unit via a radio communication network and having a general control database for storing said user-side data by correlating with said provider code, wherein said external reading/writing unit transmits said user-side data read out of said non-contact IC and said provider code to said general control server on condition that after it has written said provider code to said non-contact IC, said portable information terminal approaches again within the predetermined range from said external reading/writing unit, and said general control server registers said provider code and said user-side data received from said external reading/writing unit to said general control database by correlating them with each other.

9. The service providing system as set forth in claim 1, wherein said portable information terminal stores a plurality of information notification levels corresponding to degrees of said user-side data notified to said external reading/writing unit in said notification data table, and said external reading/writing unit stores said plurality of information notification levels by correlating with a plurality of types of said provider-side data, respectively, in said write data table.

10. The service providing system as set forth in claim 9, wherein said plurality of information notification levels contains non-notified levels on which said user-side data is not notified to said external reading/writing unit and said non-notified level is correlated with said provider-side information prepared to be written to said non-contact IC in said write data table stored in said external reading/writing unit.

11. The service providing system as set forth in claim 1, wherein said portable information terminal deletes said user-side data stored in said non-contact IC on condition that said user-side data has been read out of said non-contact IC in accordance to said portable terminal-side application.

12. The service providing system as set forth in claim 1, wherein said portable information terminal deletes said user-side data stored in said non-contact IC on condition that a predetermined time has elapsed since when said user-side data has been written to said non-contact IC in accordance to said portable terminal-side application.

13. The service providing system as set forth in claim 1, wherein when said portable information terminal is staffed said portable information terminal retrieves said user-side data within said non-contact IC and deletes said detected user-side data out of said non-contact IC.

14. The service providing system as set forth in claim 1, wherein when said portable terminal-side application is started said portable information terminal retrieves said user-side data within said non-contact IC in accordance to said portable terminal-side application and deletes said detected user-side data out of said non-contact IC.

15. The service providing system as set forth in claim 1, wherein said external reading/writing unit deletes said user-side data stored in said non-contact IC on condition that said user-side data has been read out of said non-contact IC in accordance to said external unit-side application.

16. The service providing system as set forth in claim 1, wherein
said external reading/writing unit farther stores a provider code for identifying a service provider, and said general control database stores said user-side data by correlating with said provider code,
said portable information terminal transmits said provider code and said user-side data written to said non-contact IC to said general control server on condition that said provider code has been written to said non-contact IC, and
said general control server registers said provider code and said user-side data received from said portable information terminal to said general control database by correlating them with each other.

17. The service providing system as set forth in claim 16, wherein said portable information terminal notifies said user that said provider code has been written to said non-contact IC when said provider code has been written to said non-contact IC and transmits said provider code written to said non-contact IC and said user-side data to said general control server on condition that said user has inputted an instruction to transmit said provider code to said general control server.

18. The service providing system as set forth in claim 16, wherein
said general control server transmits a notification of completion of registration indicating that the registration has been completed to said portable information terminal when said general control server has registered said provider code and said user-side data to said general control database by correlating them with each other,
said portable information terminal writes said notification of completion of registration received from said general control server to said non-contact IC by correlating with said provider code related with said registration, and
said external reading/writing unit writes said provider-side data to said non-contact IC on condition that the data read out of said non-contact IC contains the identical provider code with said provider code stored in said external reading/writing unit and said notification of completion of registration.

19. The service providing system as set forth in claim 16, wherein
said general control server transmits a notification of completion of registration indicating that the registration has been completed to said external reading/writing unit when said general control server has registered said provider code and said user-side data to said general control database by correlating them with each other,
said external reading/writing unit stores said notification of completion of registration received from said general control server by correlating with said user-side data related to the registration, and
said external reading/writing unit writes said provider-side data to said non-contact IC on condition that said notification of completion of registration has been stored by being correlated with said user-side data read out of said non-contact IC.

20. The service providing system as set forth in claim 16, wherein
said portable information terminal transmits updated data for updating said user-side data registered to said general control database to said general control server in accordance to said portable terminal-side application,
said general control server updates said user-side data in said general control database by said updated data received from said portable information terminal and transmits said updated data to said external reading/writing unit specified by said provider code correlated with said updated user-side data, and
said external reading/writing unit updates said user-side data already stored by said updated data received from said general control server.

21. The service providing system as set forth in claim 16, wherein
said portable information terminal transmits updated data for updating said user-side data to said external reading/writing unit via said non-contact IC in accordance to said portable terminal-side application,
said portable information terminal transmits said updated data read out of said portable information terminal via said non-contact IC to said general control server,
said general control server updates said user-side data in said general control database by said updated data received from said external reading/writing unit and transmits said updated data to said external reading/writing unit specified by said provider code correlated with said updated user-side data, and
said external reading/writing unit updates said user-side data already stored by said updated data received from said general control server.

22. A service providing system, comprising:
a non-contact IC from/to which data can be read/written in non-contact;
a portable information terminal, holding said non-contact IC, for reading/writing data from/to said non-contact IC;
a portable terminal-side application, executed on said portable information terminal, for controlling reading/writing of said portable information terminal from/to said non-contact IC;
an external reading/writing unit capable of reading/writing data of said non-contact IC in non-contact; and
an external unit-side application, executed on said external reading/writing unit, for controlling reading/writing of said external reading/writing unit from/to said non-contact IC,
wherein
said portable information terminal stores a notification data table in which an information notification level that indicates a degree of user-side data which is the user-side information of said portable information terminal notified to said external reading/writing unit is correlated with said user-side data to be notified to said external reading/writing unit,
said external reading/writing unit stores a write data table in which a provider code for identifying a service provider, provider-side data prepared to be written from said external reading/writing unit to said non-contact IC and said information notification level are correlated with each other,
said external reading/writing unit reads data out of said non-contact IC when said portable information terminal approaches within a predetermined range from said external reading/writing unit, judges whether or not the identical provider code with said provider code stored in said external reading/writing unit is contained in said data read out of said non-contact IC, provides predetermined member service to the user of said portable information terminal when said provider code is contained, and transmits a start request of said portable terminal-side application and said provider code to said portable information terminal via said non-contact IC when said provider code is not contained,
said portable information terminal staffs said portable terminal-side application corresponding to said start request, judges whether or not the identical provider code with said provider code obtained out of said external reading/writing unit via said non-contact IC is stored in advance in a body-side memory that is a memory within said portable information terminal or in said non-contact IC in accordance to said staffed portable terminal-side application, enables the user of said portable information terminal to select said information notification level when said provider code is not stored in advance in said body-side memory or said non-contact IC and writes said user-side data correlated with said information notification level selected by said user in said notification data table and said information notification level selected by said user to said non-contact IC, and said external reading/writing unit reads said user-side data and said information notification level out of said non-contact IC, stores said user-side data read out of said non-contact IC in accordance to said external unit-side application and writes said provider-side data and said provider code correlated with said information notification level read out of said non-contact IC in said write data table to said non-contact IC.

23. The service providing system as set forth in claim 22, wherein said portable information terminal stores a plurality of information notification levels corresponding to degrees of said user-side data notified to said external reading/writing unit in said notification data table, and said external reading/writing unit stores said plurality of information notification levels by correlating with a plurality of types of said provider-side data, respectively, in said write data table.

24. The service providing system as set forth in claim 23, wherein said plurality of information notification levels contains non-notified levels on which said user-side data is not notified to said external reading/writing unit and said non-notified level is correlated with said provider-side information prepared to be written to said non-contact IC in said write data table stored in said external reading/writing unit.

25. The service providing system as set forth in claim 22, wherein said portable information terminal deletes said user-side data stored in said non-contact IC on condition that said user-side data has been read out of said non-contact IC in accordance to said portable terminal-side application.

26. The service providing system as set forth in claim 22, wherein said portable information terminal deletes said user-side data stored in said non-contact IC on condition that a predetermined time has elapsed since when said user-side data has been written to said non-contact IC in accordance to said portable terminal-side application.

27. The service providing system as set forth in claim 22, wherein when said portable information terminal is started said portable information terminal retrieves said user-side data within said non-contact IC and deletes said detected user-side data out of said non-contact IC.

28. The service providing system as set forth in claim 22, wherein when said portable terminal-side application is started said portable information terminal retrieves said user-side data within said non-contact IC in accordance to said portable terminal-side application and deletes said detected user-side data out of said non-contact IC.

29. The service providing system as set forth in claim 22, wherein said external reading/writing unit deletes said user-side data stored in said non-contact IC on condition that said user-side data has been read out of said non-contact IC in accordance to said external unit-side application.

30. The service providing system as set forth in claim 22, wherein said external reading/writing unit deletes said user-side data stored in said non-contact IC on condition that said external reading/writing unit has detected that both said user-side data and said provider code are stored in said non-contact IC in accordance to said external unit-side application.

31. The service providing system as set forth in claim 22, further comprising a general control server that communicates with said portable information terminal via a radio communication network and has a general control database for storing said user-side data by correlating with said provider code, wherein said portable information terminal transmits said provider code and said user-side data written to said non-contact IC to said general control server on condition that said provider code has been written to said non-contact IC, and said general control server registers said provider code and said user-side data received from said portable information terminal to said general control database by correlating them with each other.

32. The service providing system as set forth in claim 31, wherein said portable information terminal notifies said user that said provider code has been written to said non-contact IC when said provider code has been written to said non-contact IC and transmits said provider code written to said non-contact IC and said user-side data to said general control server on condition that said user has inputted an instruction to transmit said provider code to said general control server.

33. A service providing system, comprising:
a non-contact IC from/to which data can be read/written in non-contact;
a portable information terminal, holding said non-contact IC, for reading/writing data from/to said non-contact IC;
a portable terminal-side application, executed on said portable information terminal, for controlling reading/writing of said portable information terminal from/to said non-contact IC;
an external reading/writing unit capable of reading/writing data of said non-contact IC in non-contact; and
an external unit-side application, executed on said external reading/writing unit, for controlling reading/writing of said external reading/writing unit from/to said non-contact IC;
wherein
said external reading/writing unit stores a provider code for identifying a service provider and provider-side data prepared to be written from
said external reading/writing unit to said non-contact IC, and said external reading/writing unit reads data out of said non-contact IC when said portable information terminal approaches within a predetermined range from said external reading/writing unit, judges whether or not the identical provider code with said provider code stored in said external reading/writing unit is contained in said data read out of said non-contact IC, provides predetermined member service to the user of said portable information terminal when said provider code is contained, and transmits a start request of said portable terminal-side application and said provider code to said portable information terminal via said non-contact IC when said provider code is not contained.

* * * * *